(12) United States Patent
Aikawa et al.

(10) Patent No.: US 11,815,171 B2
(45) Date of Patent: Nov. 14, 2023

(54) DIFFERENTIAL DEVICE

(71) Applicant: GKN Automotive Limited, Birmingham (GB)

(72) Inventors: Masashi Aikawa, Tochigi (JP); Ken Tsuchino, Tochigi (JP); Masahiko Asahi, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/146,487

(22) Filed: Dec. 27, 2022

(65) Prior Publication Data

US 2023/0133653 A1    May 4, 2023

Related U.S. Application Data

(63) Continuation of application No. PCT/JP2020/028231, filed on Jul. 21, 2020.

(51) Int. Cl.
*F16H 48/34* (2012.01)
*F16H 48/08* (2006.01)
*F16H 48/24* (2006.01)

(52) U.S. Cl.
CPC ........... *F16H 48/34* (2013.01); *F16H 48/08* (2013.01); *F16H 48/24* (2013.01); *F16H 2048/346* (2013.01)

(58) Field of Classification Search
CPC .......... F16H 48/34; F16H 48/24; F16H 48/08; F16H 2048/346; F16H 2048/204
See application file for complete search history.

(56) References Cited

U.S. PATENT DOCUMENTS 6,827,661 B2 * 12/2004 Fusegi ............... F16H 48/34
475/150
6,945,895 B2 * 9/2005 Fusegi ............... F16H 48/08
192/84.92
(Continued)

FOREIGN PATENT DOCUMENTS

JP    H02-286944 A    11/1990
JP    2003322240 A    11/2003
(Continued)

OTHER PUBLICATIONS

International Search Report and Written Opinion for PCT/JP2020/028231 dated Sep. 8, 2020 (11 pages; with English translation).

*Primary Examiner* — Tisha D Lewis
(74) *Attorney, Agent, or Firm* — Bejin Bieneman PLC

(57) ABSTRACT

A differential device is provided with: an input case having an axially directed end face; a differential gear set with side gears allowing a differential motion therebetween; dog teeth toothed toward the end face on an output case; a clutch structure engageable with the dog teeth and so structured as to couple the output case or the second side gear with the input case when engaged; an axially movable clutch member including an internal end and an external end exposed to the exterior; an axially movable armature including a magnetic material and in contact with the external end; a solenoid supported away from the end face, the solenoid generating a magnetic flux to attract the armature and, via the clutch member, set the clutch structure in mesh with the dog teeth; and a spring biasing the clutch member in a contrary direction.

20 Claims, 7 Drawing Sheets

(56) References Cited

U.S. PATENT DOCUMENTS

| | | | | |
|---|---|---|---|---|
| 7,074,150 | B2 * | 7/2006 | Fusegi | F16D 27/118 |
| | | | | 475/231 |
| 9,695,922 | B2 * | 7/2017 | Yamanaka | F16D 27/118 |
| 2003/0162622 | A1 | 8/2003 | Fusegi et al. | |
| 2011/0105264 | A1 | 5/2011 | Maruyama et al. | |
| 2018/0099562 | A1 | 4/2018 | Yoshisaka et al. | |

FOREIGN PATENT DOCUMENTS

| JP | 2004116730 A | 4/2004 |
|---|---|---|
| JP | 201199460 A | 5/2011 |
| JP | 2011112114 A | 6/2011 |
| JP | 201859606 A | 4/2018 |
| WO | 2017100550 A1 | 6/2017 |

* cited by examiner

DIFFERENTIAL DEVICE

CROSS-REFERENCE TO RELATED APPLICATIONS

This application is a continuation application of, and as such claims priority to, PCT International Application No. PCT/JP2020/028231 (filed Jul. 21, 2020), the entire contents of which are incorporated herein by reference.

TECHNICAL FIELD

The disclosure herein relates to a differential device including a differential device provided with an actuator driven by an attractive solenoid to enable operation of a clutch.

BACKGROUND

When a four-wheel vehicle runs on a rough road, its driving force is more preferably transmitted to all the four wheels than to only front or rear wheels in light of stability of traction. When the vehicle runs on a well-paved road, however, an all-wheel drive (AWD) system is inferior in light of fuel efficiency or other factors. As such, systems that offer drivers selectivity between a two-wheel drive mode and an all-wheel drive mode by mean of the drivers' intentional operation, namely referred to as "part-time AWD" systems, are frequently used.

While various drivetrains that realize part-time AWD are possible, a combination of a differential gear set that enables differential motion between axles and a clutch that temporarily couples an input shaft with the differential gear set is applicable for example. A device referred to as "free-running differential", which contains such a combination unitarily, is proposed. The PTL 1 listed below discloses an example of a free-running differential.

An actuator for driving the clutch may be a geared motor, a hydraulic device, a solenoid or such, and particularly the solenoid is superior in light of its better response. In the art disclosed in the PTL 1, the solenoid generates magnetic flux forming a loop through the core and makes the magnetic flux bypass it to the plunger to create thrust force on the plunger, thereby driving the clutch. Solenoids of this type, although creating relatively small power, enable low energy consumption operation. Attractive solenoids are, however, preferable in light of its capacity of larger power. The PTLs 2 and 3 listed below disclose examples although it is used not for a free-running differential but for locking up differential motion, in which the solenoid magnetically attracts the armature and the return spring is used for separating it away. As the solenoid, in either case, requires wiring to the vehicle body, the solenoid and related components should be rendered non-rotational whereas the differential revolves.

CITATION LIST

Patent Literature

PTL 1: Japanese Patent Application Laid-open No. 2011-112114
PTL 2: Japanese Patent Application Laid-open No. H02-286944
PTL 3: PCT International Publication WO 2017/100550 A1

SUMMARY

As a clutch is also immersed in lubricant oil for lubricating a differential gear set, viscosity of the lubricant oil resists disengagement of the clutch. Further, friction among the engaged clutch teeth, when torque acts thereon, strongly resists disengagement. Thus, to ensure disengagement of the clutch, the return spring must exert considerable repulsive force. The solenoid is in turn required to exert sufficient thrust force against the so-strengthened return spring, and an arrangement where the solenoid attracts the armature is thus advantageous. The armature, however, tends to keep adhering to the solenoid because of its residual magnetization, and therefore the return spring should exert greater repulsive force in order to separate or disengage it. The attractive solenoid and the return spring should therefore be strengthened synergistically.

How to bear the force and its reaction force is itself a technical problem and how to transmit the force to the clutch also requires significant consideration. Further, if larger magnetic flux is to be generated, careful consideration must be given to an influence by leakage of the magnetic flux to the environment. For example, to increase the magnetic path cross-sectional area of the core in order to reduce leakage of the magnetic flux a size of the device must be increased. More specifically, how to arrange and support related components in an attractive solenoid may cause many potential technical problems. The device disclosed hereafter has been created in light of these problems.

According to an aspect, a differential device is provided with: an input case rotatable about an axis and having an end face directed in a direction of the axis; a differential gear set including first and second side gears respectively rotatable about the axis and allowing a differential motion between the first and second side gears; dog teeth toothed toward the end face on an output case supporting the differential gear set or on the second side gear; a clutch structure engageable with the dog teeth and so structured as to couple the output case or the second side gear with the input case when engaged; a clutch member movable in the direction of the axis and including an internal end in communication with the clutch member and an external end exposed through the end face to an exterior of the input case; an armature movable in the direction of the axis, the armature being at least formed of a magnetic material and in contact with the external end; a solenoid supported away in the direction of the axis from the end face, the solenoid configured to generate a magnetic flux in the direction of the axis to attract the armature and, via the clutch member, set the clutch structure in mesh with the dog teeth; and a spring biasing the clutch member in a direction to disengage from the dog teeth.

DESCRIPTION OF EXAMPLE EMBODIMENTS

Exemplary embodiments will be described hereinafter with reference to the appended drawings. Throughout the following descriptions and appended claims, unless otherwise described, an axis means a rotation axis of a differential device, an axial direction means a direction parallel to the axis and a radial direction means a direction perpendicular thereto. In the following description, distinctions between right and left are given, but are only for convenience of explanation. Embodiments where right and left are reversed could occur, of course.

Figure 1:
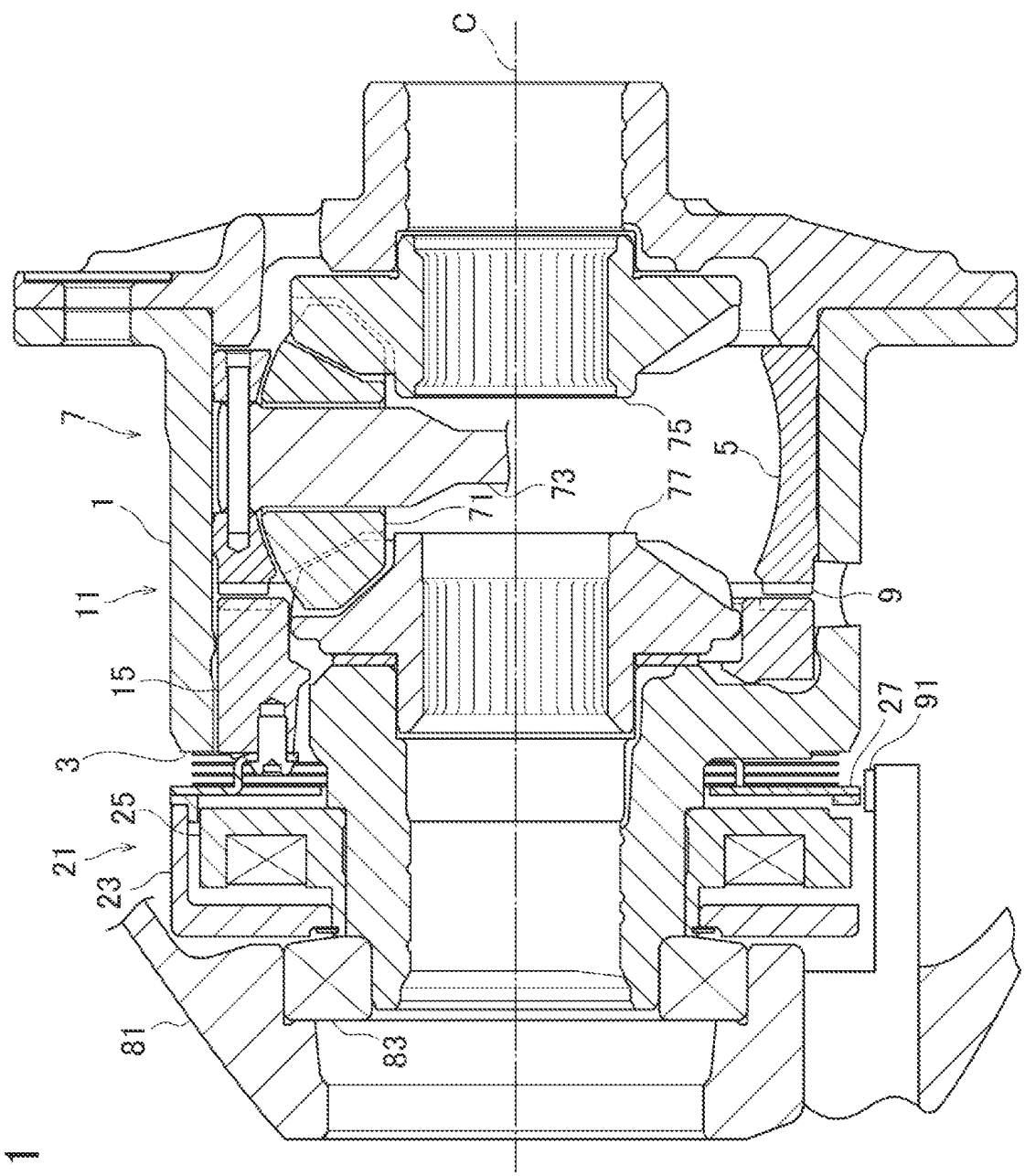
FIG. 1 is a sectional view of a differential device according to an embodiment, taken from a plane along its axis.

Referring first to FIG. 1, the differential device is usable for a purpose of allowing differential motion between both axles rotating about an axis C and as well temporarily transmitting torque from an input shaft to the axles (it could be referred to as "free-running differential" or such). The differential device could be used for embodying a part-time AWD vehicle although its application is, of course, not limited thereto.

The differential device is in general composed of an input case 1 that receives torque from the input shaft, a clutch 11 for operating a differential gear set 7, and an actuator 21 for driving the clutch 11. The differential device may be provided with an output case 5 supporting the differential gear set 7, and the output case 5 is rotatable relatively to the input case 1. The input case 1 and the output case 5 are mutually coaxial and nested, and normally but not indispensably the former houses the latter.

The input case 1 steadily or continuously connects with the input shaft to receive the torque and thereby rotate about the axis C. The input case 5 is provided with dog teeth 13 to constitute the clutch 11, and the transmitted torque is, when the clutch 11 is disengaged, not transmitted to the output case 5, thereby allowing the output case 5 to freely rotate about the axis C. If the actuator 21 makes the clutch 11 engaged, the input case 1 drivingly connects with the output case 5 to transmit the torque to the output case 5, thereby rotating together.

Figure 6:
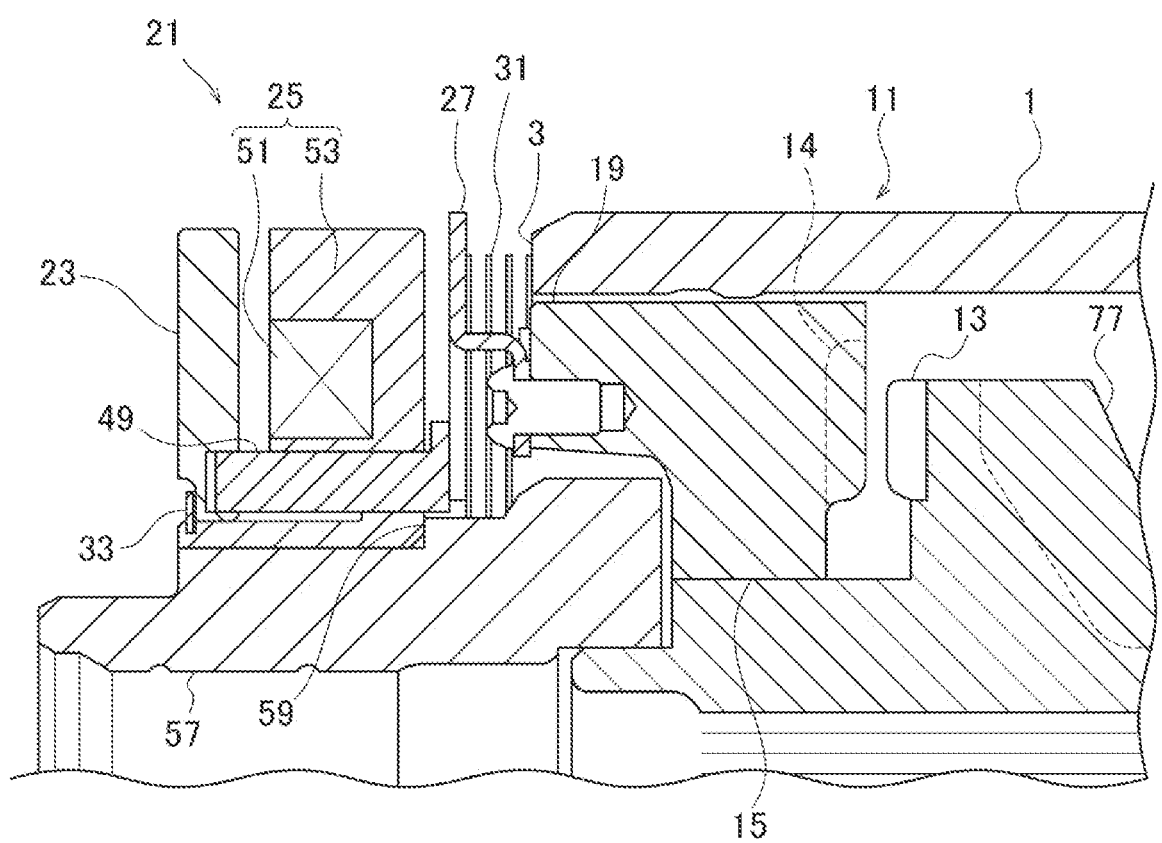
FIG. 6 is a partial sectional view showing an example in which a combination with a side gear constitutes a clutch.

Alternatively, as shown in FIG. 6, one 77 of side gears of the differential gear set 7 may be, on the back face of its gear teeth, provided with the dog teeth 13 to constitute the clutch 11. The differential gear set 7 in this example is, not via the output case 5, directly supported by the input case 1. If the clutch 11 is engaged, the side gear 77 is coupled with the input case 1. When one 77 of the side gears is fixed, the other 77 cannot make differential motion, thus the clutch 11 according to this example is used for the purpose of locking/unlocking the differential motion by the differential gear set 7. A differential device according to this example can be referred to as a "Lock-up differential" or such.

Referring back to FIG. 1, the input case 1 is in general in the form of a cylinder and end faces closing its both ends roughly isolate the interior from the exterior. The connection between the input case 1 and the input shaft may be established by a ring gear for example and a flange radially projecting the cylinder may be usable for connection to the ring gear, although another embodiment is applicable thereto, of course.

Respectively further from both the end faces of the input case 1, boss portions project axially outward, and the input case 1 is thereby supported by a carrier 81. Between the input case 1 and the carrier 81, bearings 83 such as roller bearings may be interposed, while ball bearings or any bearing devices may be substituted for the roller bearings. The actuator 21 is disposed around one 3 of the end faces.

The output case 5 is provided with the differential gear set 7 and is therefore capable of outputting torque to both the axles with allowing differential motion therebetween. According to the example illustrated in FIG. 1, the differential gear set 7 is of a bevel gear type and is provided with pinion gears 71 rotatably supported by a pinion shaft 73 and side gears 75, 77 in mesh therewith. Of course, any other proper type such as a face gear type or a planetary gear type is applicable thereto. The side gears 75, 77 may be, on these inner peripheries, provided with splines for coupling with the axles although any other form may be used for coupling.

The output case 5 is, on one end 9, provided with dog teeth 13 toothed axially and toward the end face 3 of the input case 1. The dog teeth 13 constitute the clutch 11, which drivingly connects the output case 5 with the input case 1 when engaged as described already. The clutch structure for drivingly connecting the output case 5 with the input case 1 may be, as exemplarily shown in FIG. 1, established by means of a clutch member 15, or alternatively the input case 1 may be provided with corresponding dog teeth to, in combination with the dog teeth 13, constitute the clutch 11.

Figure 2A:
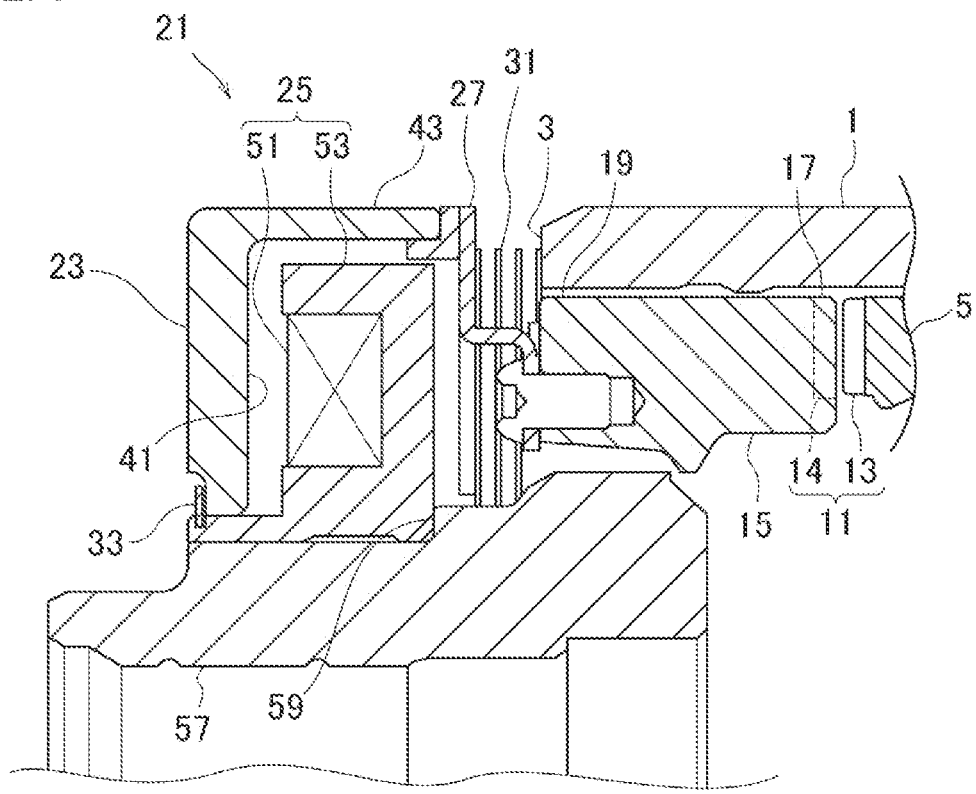
FIG. 2A is an enlarged sectional view of an actuator and its surroundings taken from FIG. 1.

Referring to FIG. 2A for example in combination with FIG. 1, the clutch member 15 is a generally ring-like member loosely fitting in the inner face of the input case 1 and is movable in the direction of the axis C. Its internal end 17 is in interior of the input case 1 to communicate with the clutch structure. From the face opposed to the internal end 17, a plurality of legs projects axially outward and respective external ends 19 thereof pass through the end face 3 and are exposed to the exterior of the input case 1. As openings on the end face 3 are engaged with the legs of the clutch member 15, the clutch member 15 is capable of transmitting torque from the input case 1 to the output case 5.

The internal end 17 may be provided with second dog teeth 14 and the dog teeth 13 and the second dog teeth 14 are so structured as to mesh together, thereby forming the clutch 11 in combination. The clutch structure in this case is as described already in a unitary form with the clutch member 15.

The external ends 19 may be further provided with a contact plate 27 for communicating with the actuator 21. The contact plate 27 is of a plate-like shape forming a ring generally continuous in the circumferential direction, and may be provided with a part bent and raised properly for fastening with the external ends 19 and/or any proper projection for being in contact with the actuator 21. A material applied to the contact plate 27 may be, although not particularly limited, differentiated from materials applied to the input case 1 and the clutch member 15, and as well an armature 23 and a core 53 described later.

The actuator 21 is in general composed of an armature 23, a solenoid 25 and a return spring 31. The armature 23 is at least partly of a magnetic material and is thus attracted by magnetic flux generated by the solenoid 25. The armature 23 is disposed to be in contact with the external ends 19 and is thereby capable of driving the clutch member 15 in the direction of the axis C. The return spring 31 biases the clutch member 15 in the opposing or counter direction.

The entirety of the solenoid 25 is circular around the axis C and is provided with a coil 51 that generates magnetic flux in the direction of the axis and a core 53 that surrounds the coil 51 to conduct the magnetic flux. The coil 51 is a wound lead line made of a good conductor such as copper, where the direction of winding is preferably so directed as to generate magnetic flux strongest in the direction of the axis C. The core 53 may be made of a high magnetic permeability material such as ferrite so that the magnetic flux is conducted with high efficiency to improve energy efficiency and as well reduce negative effect originated from leakage of the magnetic flux to the environment. The core 53 surrounds a most part of the coil 51 but leaves a part facing the armature 23 open axially, thereby effectively directing the magnetic flux toward the armature.

Figure 2B:
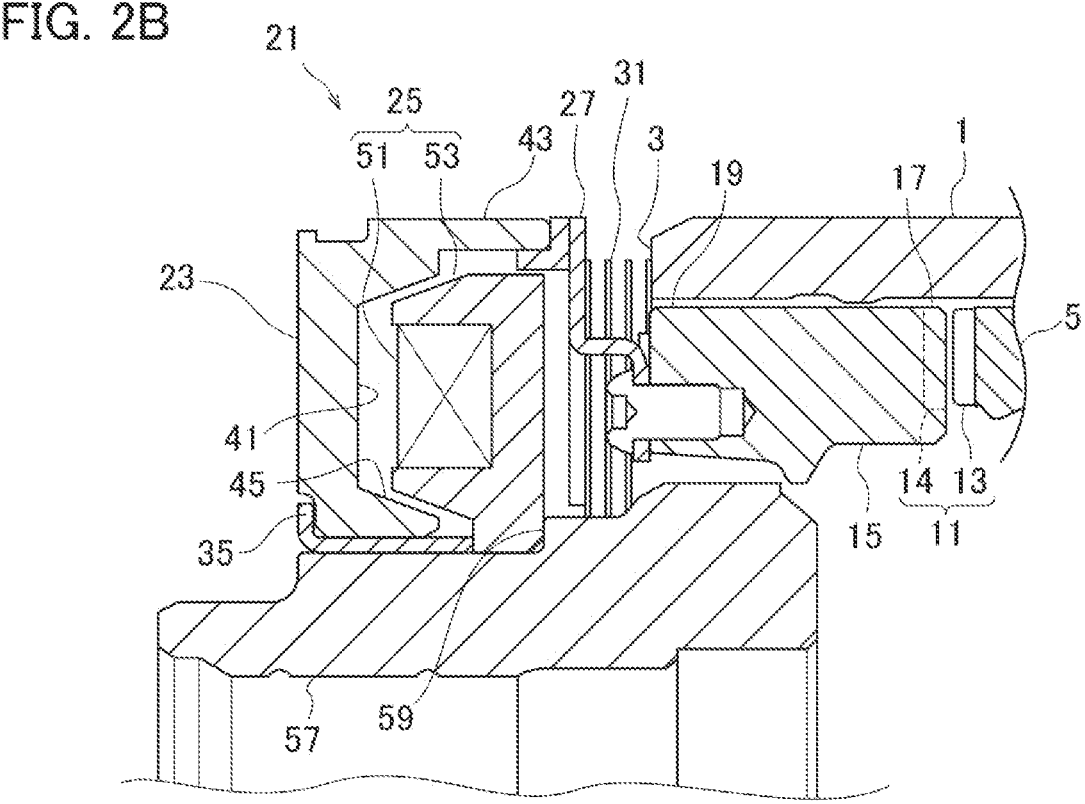
FIG. 2B is an enlarged sectional view of a modified example, which corresponds to FIG. 2A.

The armature 23 is provided with a radial face 41 that receives the aforementioned magnetic flux and is attracted thereby, which may be a disk-like face expanding in the radial direction. To broaden the area for receiving the magnetic flux, as shown in FIG. 2B, it may be further provided with a bevel 45 inclining toward the core 53 and the bevel 45 may be not only on the radial inside but also on the outside. The core 53 may be in a form complementary to the bevels.

The armature 23 is further provided with an axial section 43 so elongated as to be in contact with the external ends 19 or the contact plate 27 and thus transmit the driving force thereto. The axial section 43 may be, as exemplarily shown in FIG. 3A in combination with FIGS. 2A and 2B, for example, a cylindrical rim rising in the axial direction from the outer periphery of the radial face 41. The rim at least partly covers the core 53 and passes over its outer side to reach the external ends 19 or the contact plate 27. This shape can be formed unitarily by pressing or drawing a flat plate and is thus easy for production. Of course, its production may be done by casting or forging, or an axial section 43 as a separate body may be joined with a flat radial face 41. While such a shape is thin, it is sufficient to drive the clutch member 15 and is beneficial as the cross section of the core 53 need not be reduced.

Figure 4:
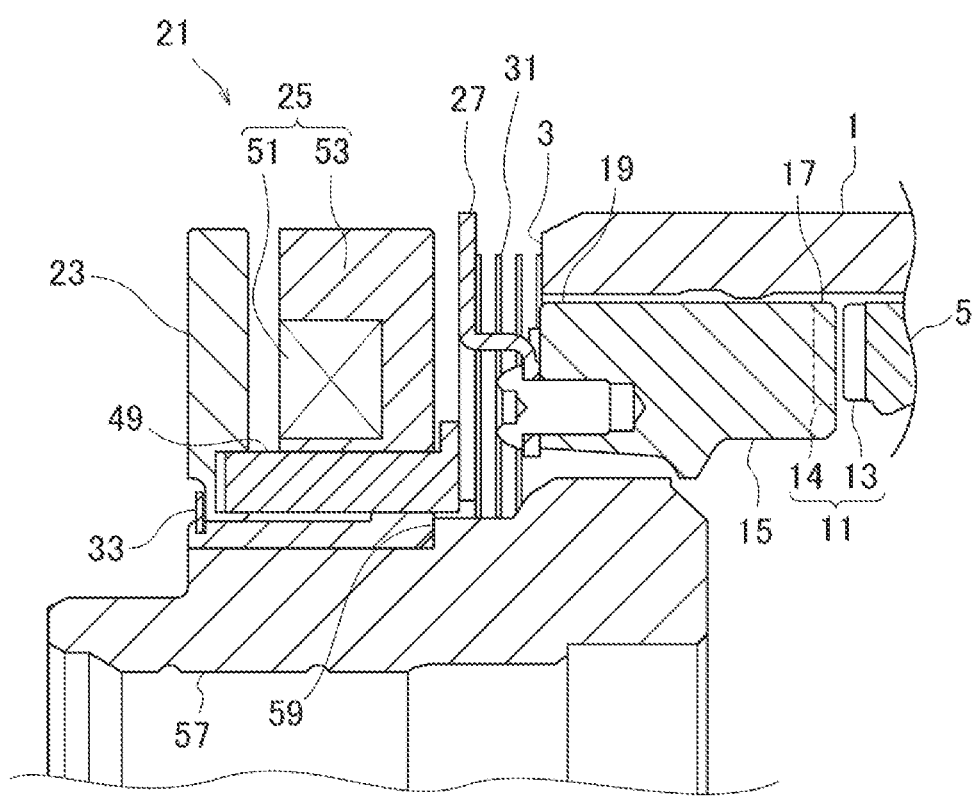
FIG. 4 is a partial sectional view showing an example in which the actuator presses via a plunger a clutch member.

The armature 23, alternatively, may be provided with columns 49, as illustrated in FIG. 4, in place of or in addition to the cylindrical rim. The columns 49 penetrate the solenoid 25, in particular the core 53, and extend axially to be in contact with the external ends 19 or the contact plate 27. The columns 49 may pass over the radial inside relative to the coil 51 as shown or over the outside. In these embodiments, as the columns 49 anti-rotate, i.e., prevent rotation of, the armature 23, a cut-out such as described later may be omitted. Further alternatively, the columns 49 may detour the core 53 around its outer periphery. In this case, the columns 49 may be anti-rotated by engagement with a pin 85 described later or may have an independent anti-rotation means.

The axial section 43 or the columns 49 may be of the same material as that of the radial face 41 and also formed as a unitary body therewith, but nevertheless may be of a non-magnetic material and formed as separate bodies. In a case of the non-magnetic material, leakage of the magnetic flux can be reduced and its negative effect can be suppressed.

Further between the axial section 43 or the columns 49 and the external ends 19 or the contact plate 27, a bush as a separate body from them may be interposed. The bush is ring-like and therefore, when the case 1 rotates, keeps contact with both these members. The bush may be of a non-magnetic material and further of a resin having a low friction coefficient, for example, to reduce friction.

As the internal periphery of the core 53 fits on the boss portion 57, the totality of the actuator 21 is supported thereby. Except the internal periphery, the core 53 is set away from the input case 1 and particularly kept between the back face of the core 53 and the end face 3 of the input case 1 is a considerable gap. This is helpful in reducing leakage of the magnetic flux from the core 53 toward the end face 3. The boss portion 57 may be provided with a shoulder 59 slightly expanding radially outward in order to place the core 53 in position. The extent of the shoulder 59 is at least short of the back face of the coil 51 and therefore the gap is kept at least at the radially outer side of the internal periphery of the coil 51.

The internal periphery of the core 53 may be elongated axially in a direction opposite to the shoulder 59 as shown in FIGS. 2A and 4. This elongated section may substantially form a cylindrical shape and is usually formed in a unitary body with the core 53 but may be a separate body fixed to the core 53. Its end may abut on the bearing 83 and be thereby prevented from falling off. Alternatively the boss portion 57 may be provided with a fall-off prevention member in order to prevent the core 53 from falling off. Such a member is for example a ring engaging with the boss portion 57 and may be of a non-magnetic material in order to prevent leakage of the magnetic flux. The internal periphery of the core 53 may not necessarily be, however, throughout its face in contact with the boss portion 57. To reduce the contact area, any groove or recess may exist on the internal periphery of the core 53. This is also helpful in reducing leakage of the magnetic flux and also helpful in reducing slide drag between the core 53 and the boss portion 57.

The armature 23 may fit on the boss portion 57, but instead may fit on its elongated section of the core 53. In any case, they are in a slidable fitting relation and therefore the armature 23 is axially movable. As both the armature 23 and the core 53 are non-rotational and the former fits on the latter, it is advantageous in smoothing its axial travel. To prevent the armature 23 from falling off, a ring 33 engaging with the core 53 or the boss portion 57 may be used. The ring may be of a non-magnetic material to reduce leakage of the magnetic flux.

Alternatively, a support member 35 for supporting the core 53 and the armature 23 may be provided as shown in FIG. 2B. The support member 35 is substantially in the form of a cylinder for example and its end may abut on the bearing 83 so as to be prevented from falling off. The support member 35 is in contact with the core 53 and both are non-rotational, and it can prevent the core from falling off. The support member 35 may alternatively establish tight-fitting on the boss portion 57 or have a structure for engaging with the boss portion 57. The armature 23 may slidably fit on the support member 35, thereby being helpful in suppressing leakage of the magnetic flux from the armature 23 to the boss portion 57. To prevent the armature 23 from falling off, the support member 35 may be provided with any fall-off prevention structure and an example thereof is a short flange formed by bending the end thereof outward as shown. The support member 35 may be also of a non-magnetic material in order to reduce leakage of the magnetic flux.

The return spring 31 may be disposed in the gap kept between the back face of the core 53 and the end face 3 of the input case 1. It may be interposed particularly between the contact plate 27 and the end face 3. The return spring 31 may be slightly compressed in advance to bias the clutch member 15 in a direction to promote its disengagement.

Figure 3A:
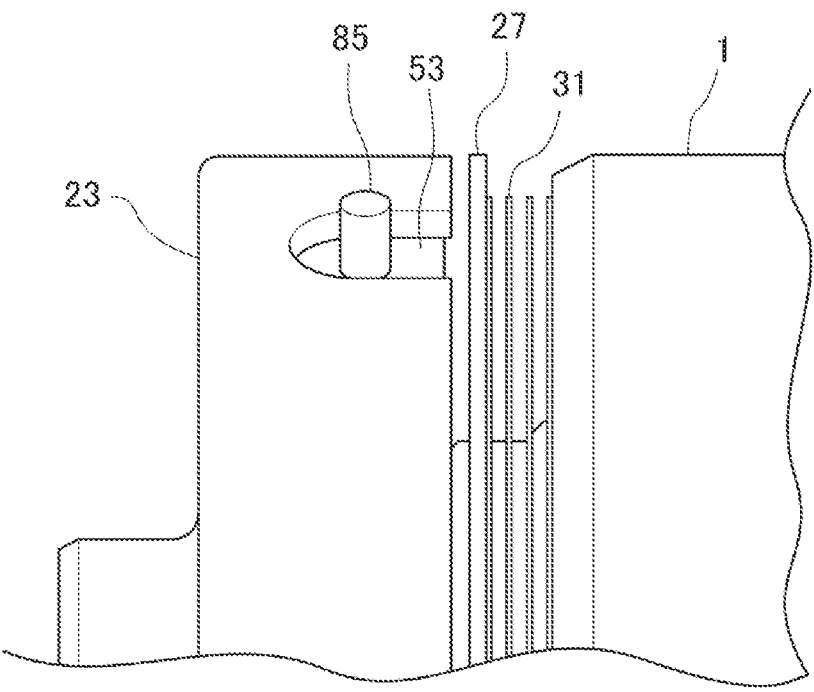
FIG. 3A is a partial elevational view of a structure for anti-rotating the actuator of an example.
Figure 3B:
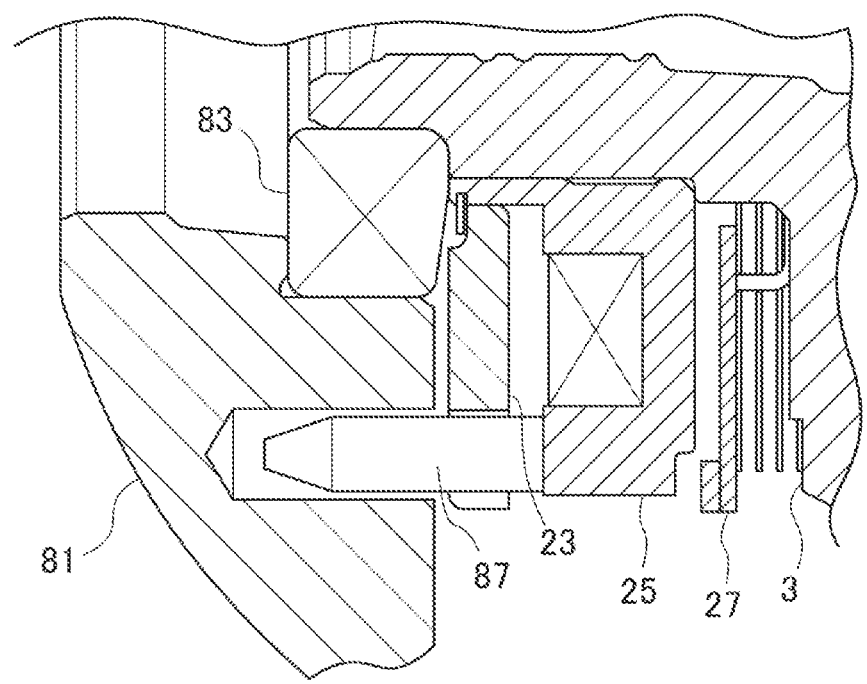
FIG. 3B is a partial elevational view of a structure for anti-rotating the actuator of another example.

While the return spring 31 is rotational along with the contact plate 27 and such, the armature 23 and the solenoid 25 are non-rotational and are preferably anti-rotated, i.e., held in place to prevent rotation. The core 53 may be provided with a pin 85 projecting radially outward, as shown in FIG. 3A for example, and the anti-rotation of the solenoid 25 may be realized by latching the pin 85 on the carrier 81. The armature 23 may be provided with any structure engaging with the solenoid 25, which may be a cut-out on the axial section 43 for engaging with the pin 85. Alternatively applicable are pins 87 elongated from the core 53 to penetrate the armature 23 as shown in FIG. 3B. In any case the armature 23 along with the solenoid 25 may be anti-rotated, i.e., secured, by pins 85 and 87. The pins 85 and 87 may be formed in a unitary body with the core 53 but may be a separate body made of a non-magnetic material. In the case where it is of a non-magnetic material, leakage of the magnetic flux can be reduced and its negative effect can be suppressed.

Referring back to FIG. 1, the differential device may be provided with any suitable means for detecting whether the clutch 11 is or is not engaged; one example is a contactless sensor 91. Examples of the contact less sensor 91 include, but are not limited to, a sensor using high-frequency oscillation to detect proximity of metal, a sensor detecting change of electrostatic capacitance, electric field or magnetic field, and a sensor using optical means. These contactless sensors can avoid energy loss caused by contact between rotating components.

Figure 5A:
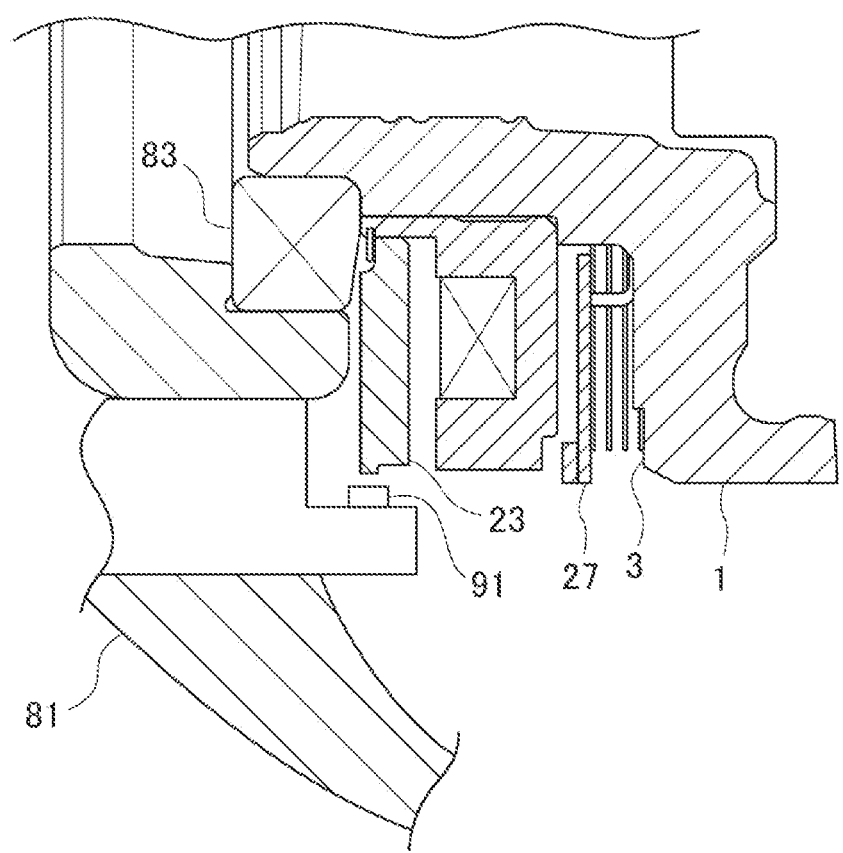
FIG. 5A is a partial sectional view showing another example about a relation between a sensor and the actuator.

The contactless sensor 91 may be disposed where it can detect whether the contact plate 27 is close thereto or away therefrom. As will be understood from the preceding descriptions, the contact plate 27 is exposed out of the outer periphery of the differential device and moves in the gap between the core 53 and the input case 1, therefore the contactless sensor 91 can execute precise detection without any disturbance by ambient components. While the contact plate 27 is rotational but ring-like as described already, during rotation, it steadily or continuously faces the contactless sensor 91 and is therefore available for detection of its axial position. Further as described already, as any arbitrary material is applicable to the contact plate 27, it is allowed to select a material appropriate for detection by the contactless sensor 91. Of course, instead of the contact plate 27, any other part of the clutch member 15 could be selected as a subject for detection or, as illustrated in FIG. 5A, any part of the armature 23 may be selected as the subject for detection. The armature 23, being non-rotational, steadily or constantly opposes the equally non-rotational contactless sensor 91 and is thus available for detection of the position. Further, these components could additionally include any proper member for convenience of detection.

Figure 5B:
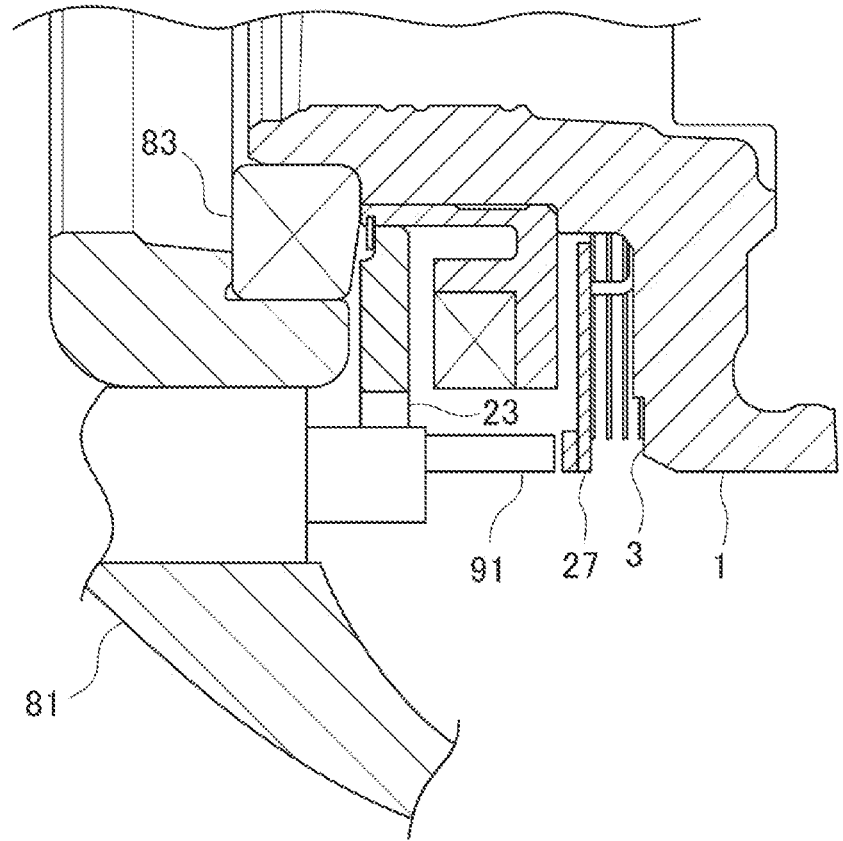
FIG. 5B is a partial sectional view showing still another example, which corresponds to FIG. 5A.

The contactless sensor 91 is described above to approach an axially moving component in the orthogonal direction but the contactless sensor 91 may be directed in the axial direction as illustrated in FIG. 5B. The subject of detection may be the armature 23 or, as shown, the contact plate 27. In the latter case, in order to avoid interference by the armature 23 and the core 53, these components may be partly cut out. It is unnecessary to totally cut out them as the armature 23 and the core 53 are non-rotational components and instead only a part in question could be cut out. Of course, in place of forming cut-outs, the contact plate 27 may be expanded in diameter so as to project radially outward from outer edges of the armature 23 and the core 53.

Figure 5C:
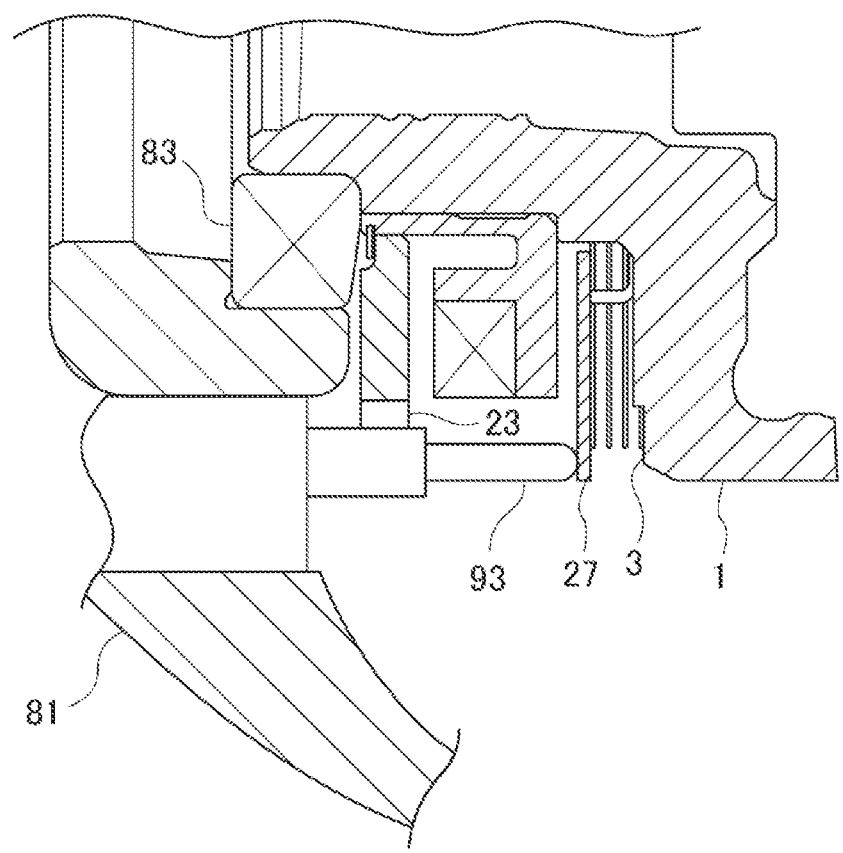
FIG. 5C is a partial sectional view of an example using a contact sensor, which corresponds to FIG. 5A.

Alternatively, in place of the contactless sensor, as shown in FIG. 5C, a contact sensor 93 is also applicable. The contact sensor 93 could be a mechanical push switch or a pull switch. Of course, a sensor using electric, magnetic or optical means may be used. The subject of detection includes the armature 23 and the contact plate 27 as described above, or any other part of the clutch member 15 may be the subject.

Further, in place of or in addition to any of the aforementioned sensors, a speed sensor or any other sensor may be provided for the differential device. The contact plate 27 may be correspondingly provided with notches or teeth formed on its peripheral edge, which cause the sensor to create pulses corresponding to its speed. As the contact plate 27 is a rotational member rotating in synchronous with the input case 1, it is available for not only detecting whether the clutch 11 is engaged but also obtaining the rotational speed.

In the differential device described herein, leakage of the magnetic flux from the solenoid to the input case, particularly from the side face of the core to the end face of the input case, is reduced. In attractive solenoids, as the magnetic flux is densest in this direction and thus potently attracts the input case, it may cause prominent energy loss by friction if the back face of the core and the end face of the input case are mutually in contact. Further, as the input case rotates in the direction orthogonally to the magnetic flux, creation of induced current as well causes energy loss and this loss could increase as the magnetic force increases. The differential device described herein can reduce both these energy losses. Further, as it is unnecessary to increase the cross sectional area of the core to address leakage of the magnetic flux, the device could be designed in a more compact form. On the other hand, as the relatively broad gap between the back face of the core and the end face of the input case is available for the return spring, greater freedom of design about the return spring could be enjoyed and it is helpful to ensure sufficient repulsive force and a sufficient length of expansion and contraction. Further, as the contact plate is exposed radially outward in the gap, it is easy to detect the state of the clutch by means of sensors.

Although certain exemplary embodiments are described above, modifications and variations of the embodiments will occur to those skilled in the art, in light of the above teachings.

What is claimed is:
1. A differential device comprising:
an input case rotatable about an axis and having an end face directed in a direction of the axis;
a differential gear set including first and second side gears respectively rotatable about the axis and allowing a differential motion between the first and second side gears;
dog teeth toothed toward the end face on an output case supporting the differential gear set or on the second side gear;
a clutch structure engageable with the dog teeth and so structured as to couple the output case or the second side gear with the input case when engaged;
a clutch member movable in the direction of the axis and including an internal end in communication with the clutch member and an external end exposed through the end face to an exterior of the input case;
an armature movable in the direction of the axis, the armature including a magnetic material and in contact with the external end;
a solenoid supported away in the direction of the axis from the end face, the solenoid configured to generate a magnetic flux in the direction of the axis to attract the armature and, via the clutch member, set the clutch structure in mesh with the dog teeth; and
a spring biasing the clutch member in a direction to disengage from the dog teeth;

wherein the armature includes a radial face spreading radially to receive the magnetic flux, and an axial section elongated axially from the radial face toward the external end;

wherein the axial section is in contact with the external end; and wherein the axial section includes a cylinder at least partly covering an outer periphery of the solenoid and in contact with the external end.

2. The differential device of claim 1, wherein the axial section is a separate body from the radial face and formed of a non-magnetic material.

3. The differential device of claim 1, wherein the input case includes a boss portion elongated from the end face in the direction of the axis, the solenoid includes a coil to generate the magnetic flux and a core surrounding the coil to conduct the magnetic flux, and the core slidably fits on the boss portion so that the solenoid is supported by the input case.

4. The differential device of claim 3, wherein the core includes, as a unitary body or a separate body, a support portion slidably fitting on the boss portion and elongated axially to be in contact with a bearing for supporting the boss portion.

5. The differential device of claim 4, wherein the armature fits on the support portion so as to be axially movably supported.

6. The differential device of claim 3, wherein the core includes a pin for preventing rotation of the solenoid, the pin stretching radially or axially, and the armature engages with the pin so that the armature along with the solenoid is prevented from rotation.

7. The differential device of claim 1, wherein the external end of the clutch member includes a contact plate forming a ring continuously around the axis and the contact plate is disposed between the solenoid and the end face and in contact with the armature.

8. The differential device of claim 7, wherein the spring is interposed between the end face and the contact plate to bias the contact plate.

9. The differential device of claim 7, wherein the contact plate is exposed radially outward, whereby the contact plate is detectable by a sensor.

10. The differential device of claim 1, wherein the clutch structure forms a unitary body with the clutch member so as to move with the clutch member, and includes second dog teeth to be in mesh with the dog teeth.

11. A differential device, comprising:
an input case rotatable about an axis and having an end face directed in a direction of the axis;
a differential gear set including first and second side gears respectively rotatable about the axis and allowing a differential motion between the first and second side gears;
dog teeth toothed toward the end face on an output case supporting the differential gear set or on the second side gear;
a clutch structure engageable with the dog teeth and so structured as to couple the output case or the second side gear with the input case when engaged;
a clutch member movable in the direction of the axis and including an internal end in communication with the clutch member and an external end exposed through the end face to an exterior of the input case;
an armature movable in the direction of the axis, the armature including a magnetic material and in contact with the external end;
a solenoid supported away in the direction of the axis from the end face, the solenoid configured to generate a magnetic flux in the direction of the axis to attract the armature and, via the clutch member, set the clutch structure in mesh with the dog teeth; and
a spring biasing the clutch member in a direction to disengage from the dog teeth;
wherein the armature includes a radial face spreading radially to receive the magnetic flux, and an axial section elongated axially from the radial face toward the external end;
wherein the axial section is in contact with the external end; and
wherein the axial section includes a column penetrating the solenoid and in contact with the external end.

12. The differential device of claim 11, wherein the axial section is a separate body from the radial face and formed of a non-magnetic material.

13. The differential device of claim 11, wherein the input case includes a boss portion elongated from the end face in the direction of the axis, the solenoid includes a coil to generate the magnetic flux and a core surrounding the coil to conduct the magnetic flux, and the core slidably fits on the boss portion so that the solenoid is supported by the input case.

14. The differential device of claim 13, wherein the core includes, as a unitary body or a separate body, a support portion slidably fitting on the boss portion and elongated axially to be in contact with a bearing for supporting the boss portion.

15. The differential device of claim 14, wherein the armature fits on the support portion so as to be axially movably supported.

16. The differential device of claim 13, wherein the core includes a pin for preventing rotation of the solenoid, the pin stretching radially or axially, and the armature engages with the pin so that the armature along with the solenoid is prevented from rotation.

17. The differential device of claim 11, wherein the external end of the clutch member includes a contact plate forming a ring continuously around the axis and the contact plate is disposed between the solenoid and the end face and in contact with the armature.

18. The differential device of claim 17, wherein the spring is interposed between the end face and the contact plate to bias the contact plate.

19. The differential device of claim 17, wherein the contact plate is exposed radially outward, whereby the contact plate is detectable by a sensor.

20. The differential device of claim 11, wherein the clutch structure forms a unitary body with the clutch member so as to move with the clutch member, and includes second dog teeth to be in mesh with the dog teeth.

* * * * *